United States Patent Office 3,402,143
Patented Sept. 17, 1968

3,402,143
METHOD FOR DECOLORIZATION AND CAPPING POLYPHENYLENE ETHERS
Allan S. Hay, Schenectady, N.Y., assignor to General Electric Company, a corporation of New York
No Drawing. Filed Oct. 5, 1967, Ser. No. 672,956
6 Claims. (Cl. 260—47)

ABSTRACT OF THE DISCLOSURE

Alkali metal adducts of diaryl ketones are reacted with polyphenylene ethers. This reaction does not introduce alkali metal atoms on to the carbon atoms of the phenylene ether repeating units, but does form alkali metal compounds with the hydroxyl groups, chromophores or chromophore-engendering groups present in the polymer molecule as well as alkali metal compounds with any chromophores or chromophore-engendering compounds sorbed on or incorporated in the polymer. Subsequent reaction with esterifying or etherifying agents converts the chromophores and chromophore-engendering materials to thermally stable colorless derivatives and the hydroxyl group to either esters or ethers which are thermally stable. This reaction is therefore extremely useful for simultaneously decolorizing and end-capping polyphenylene ethers to produce polyphenylene ethers having improved color and thermal stability.

---

This invention relates to a process of improving the color and thermal stability of polyphenylene ethers. More particularly, this invention relates to the reaction of an alkali metal adduct of a diaryl ketone (alkali metal-diarylketyls) with polyphenylene ethers, especially those in which the phenylene ether repeating unit of the polymer molecule is a 1,4-phenylene ether unit, to produce alkali metal compounds with the hydroxyl groups, chromophores and chromophore-engendering groups or compounds. Thereafter the alkali metal containing polymer is reacted with an esterifying or etherifying agent to convert the chromophores and chromophore-engendering matter to thermally stable, colorless derivatives and simultaneously end-capping the polymer by converting the hydroxyl groups to esters or ethers. The process may also be practiced when only end-capping or decolorization is desired.

Polyphenylene ethers, as a general class, are an extremely interesting group of new polymers. These polymers, both homopolymers and copolymers, and processes of producing them are disclosed in my U.S. Patents 3,306,874 and 3,306,875.

The particular polyphenylene ethers that can be used in my process are those polymers, including copolymers, having the formula

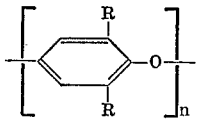

where $n$ is an integer sufficiently large that the number average molecular weight is at least 10,000 and each R is selected from the group consisting of hydrogen, alkyl free of a tertiary α-carbon atom and aryl.

R in the above formula, in addition to being hydrogen, may be any alkyl free of a tertiary α-carbon atom, including cycloalkyl and aryl substituting alkyl, examples of which are methyl, ethyl, propyl, isopropyl, n-butyl, sec-butyl, hexyl, cyclohexyl, heptyl, octyl, decyl, octadecyl, eicosyl, benzyl, phenylethyl, naphthylmethyl, phenylpropyl, tolylmethyl, xylylethyl, etc., aryl including alkyl substituted aryl, examples of which are phenyl, tolyl, xylyl, naphthyl, methylnaphthyl, ethylphenyl, biphenyl, terphenylyl, etc. Generally R has no more than 20 carbon atoms. Additional examples of substitutents which R may be are those alkyl substituents free of a tertiary α-carbon atom and aryl substituents disclosed as substituents on the starting phenols and polyphenylene ether products in my U.S. Patents 3,306,874 and 3,306,875 and copending application, Ser. No. 593,733, filed Nov. 14, 1966 and assigned to the same assignee as the present invention.

In the oxidative coupling reaction of phenols to produce polyphenylene ethers, a phenolic hydroxyl group is present on one end of each polymer molecule up to the point where the polymers have a number-average molecular weight of about 20,000. As the coupling reaction is continued to produce higher molecular weight polymer a secondary reaction, the mechanism of which is as yet unknown, causes some of these terminal hydroxyl groups to disappear. Other secondary reactions also occur which produce color in the polymer, i.e., chromophores or chromophore-engendering bodies (causing color to be developed later, for example, when heated) which can be due to amines and/or diphenoquinones sorbed or incorporated in the polymer molecule, carbonyl groups on the polymer molecule, etc. Some of these reactions may be due to small amounts of impurities in the starting phenol.

Generally, chromophores and chromophore-engendering bodies are undesirable in the polymer unless the particular color is desired. Hydroxyl, amino and carbonyl groups generally contribute to thermal degradation of the polymer when exposed to high temperature. Therefore, it would be particularly desirable to eliminate these substituents in order to improve both the color and stability of the polyphenylene ethers.

I have found that the hydroxyl groups as well as the chromophores and chromophore-engendering bodies present in or associated with the polyphenylene ethers, react very rapidly with the alkali metal adducts of diaryl ketones to produce, as intermediates, metal salts of the polyphenylene ether which on subsequent reaction with either esterifying or etherifying agents, convert the hydroxyl groups to esters or ethers and the chromophores and chromophore-engendering bodies to thermally stable colorless derivatives, but do not react further with the polyphenylene ether to metalate, i.e., introduce alkali metal substituents onto the carbon atoms of either the polyphenylene ether ring or the alkyl substituents, if present on the phenylene ring. Since the alkali metal adducts of diaryl ketones, hereinafter generally called ketyls, are deeply colored compounds, it is possible to use them in solution to titrate a solution of the polyphenylene ethers until the color of the ketyl persists. The reaction of the ketyl with the above reactive groups of the polyphenylene ether is extremely rapid, even at room temperature. Because the reaction is so rapid at room temperature, heating is not necessary but can be used providing the temperature is not so high that it causes decomposition of the ketyl. As soon as a sufficient amount of the adduct has been added to produce a persistent color, the capping agent can be added. However, since no further reaction will occur, even in the presence of an excess of the ketyl, the addition of the capping agent can be delayed as long as desired providing contact with other reactive agents, e.g., oxygen, carbon dioxide, water, etc., is avoided.

Since it is known how much of the alkali metal has been added in the form of the ketyl, the amount of esterfying or etherifying agent, hereinafter, for brevity, called the capping agent, necessary to react with all of the alkali metal is readily calculated. An excess of the capping agent is not harmful and can be used if desired. In fact, an excess aids in insuring completion of the capping reaction. Like the reaction with the ketyls, this reaction also occurs very rapidly at room temperature and at atmospheric pressure, but the use of higher or lower temperatures and pressure is not excluded. After the reaction is complete, the polyphenylene ether is isolated most conveniently from the solution by pouring the solution into a sufficient amount of a liquid, which is a nonsolvent for the polymer, to cause the polymer to precipitate. Alternatively, the nonsolvent can be added to the solution of the polymer or the solvent may be removed from the polymer by spray-drying, evaporation, preferably under vacuum, etc.

Since the diaryl ketone associated with the alkali metal does not become a part of the polymer molecule, the particular diaryl ketone forming the adduct of the alkali metal is not important nor critical. Any of the widely known and readily available diaryl ketones may be used in forming the ketyl used as the metalating agent. These diaryl ketones have the formula

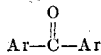

where Ar is aryl including alkaryl, e.g., phenyl, naphthyl, anthryl, tolyl, xylyl, trimethylphenyl, tetramethylphenyl, pentamethylphenyl, methylnaphthyl, methylanthryl, ethylphenyl, propylphenyl, butylphenyl, ethylmethylphenyl, octadecylphenyl, ethylnaphthyl, propylanthryl, phenanthryl, etc. The most readily available and cheapest diaryl ketones are benzophenone and the methyl substituted benzophenones and are, therefore preferred.

These diaryl ketones readily react with alkali metals to form ketyls having the formulas

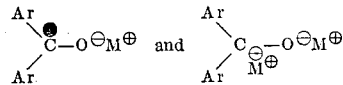

depending on the amount of alkali metal used, where Ar is as defined above and M is an alkali metal, e.g., lithium, sodium, potassium, rubidium and cesium. Since the diaryl ketones are solids and the ketyls are unstable except in solution, a liquid is used which is both a solvent for the diaryl ketone and the ketyl, and is nonreactive with the ketone, the alkali metal or the ketyl.

Particularly useful solvents are the dialkyl ethers of ethylene glycol and diethylene glycol for example, the dimethyl ether of ethylene glycol (glyme), the diethyl ether of ethylene glycol, the dimethyl ether of diethylene glycol (diglyme), the diethyl ether of diethylene glycol or cyclic ethers for example, tetrahydrofuran (THF), alkyl substituted tetrahydrofurans, etc. Aromatic hydrocarbons can be used as solvents providing they are used in conjunction with a tertiary alkyl amine, including polyamines, for example, trimethylamine (TMA), triethylamine (ETA), N,N,N',N' - tetramethylethylenediamine (TMEDA), triethylenediamine (TEDA), etc., which chelate with, and therefore, solubilize the alkali metal moiety of the ketyl in aromatic hydrocarbons, for example, benzene, toluene, xylene, etc. In these solvents, diaryl ketones readily react with and dissolve the solid alkali metals, preferably used in finely divided form, to produce the highly colored ketyls.

Since both the alkali metal and the ketyls are extremely reactive with oxygen, carbon dioxide, and moisture, precautions must be taken to use anhydrous materials and to make and store the solutions of the ketyls in a dry inert atmosphere. This precaution also must be observed in reacting the ketyl with the polyphenylene ethers. The titer of the solution of the ketyl is readily determined by well-known titration techniques.

The reaction of the above ketyls with the polyphenylene ethers generally is carried out by adding the solution of the ketyl slowly or in small increments to a solution of the polyphenylene ether until the color of the ketyl persists, unless the required amount has previously been determined, in which case, it can be added all at once. An excess of the ketyl can be used and may be desired, if polymers having a very high degree of light transmission are desired. Generally, the polyphenylene ether is dissolved in a solvent which is miscible with the solution of the ketyl, i.e., does not cause the ketyl to precipitate when added to the solution of the polyphenylene ether, since the reaction will be much faster. The solvent of course should be non-reactive with the alkali metal. The solvent may also serve as solvent for the reaction product of the polyphenylene ether and the ketyl, but this is not required.

The ketyl will react with the polyphenylene ether even though the polyphenylene ether is not dissolved in the solvent, but the reaction will of course be much slower except on the surface. The use of a liquid phase in which the ketyl is soluble, but the polyphenylene ether is not, is particularly useful when it is desired to treat only the surface of a shaped particle, for example, a fiber, a film or other shaped article made from the polyphenylene ether.

Since the polyphenylene ethers are generally made in solution, the reaction of the ketyl can be carried out in the solution in which the polyphenylene ether is made. This may be particularly desirable where the lightest colored and most stable polymers are desired since, in the process of isolating, and drying, or further processing, the polymer may be subjected to conditions which may produce new chromophores which are not as readily decolorized.

Particularly useful solvents which are solvents for both the ketyls and the polyphenylene ethers are, for example, benzene, toluene, xylene, tetrahydrofuran, alkyltetrahydrofuran, etc. The alkyl ethers of ethylene glycol and diethylene glycol are particularly useful solvents for the ketyl in which the polyphenylene ethers are not soluble.

The particularly useful capping agents are hydrocarbon monoacyl halides having the formula

hydrocarbon monosulfonyl halides having the formula $R'-SO_2X$, anhydrides of hydrocarbon monocarboxylic acids having the formula

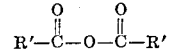

alkyl halides having the formula $R''-X$, dialkyl sulfates having the formula $R''-O-SO_2-O-R''$ and monohalosilanes and siloxanes having the formula

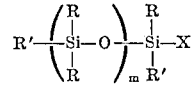

where $R''$ is alkyl, including cycloalkyl and aralkyl, $R'$ is the same as $R''$ and, in addition aryl, including alkaryl, i.e., $R'$ is the same as R disclosed above for the polyphenylene ethers, and, in addition those alkyls having a tertiary α-carbon atom. X is halogen, e.g., fluorine, chlorine, bromine and iodine and $m$ is an integer from 0 to 200. Generally, R and $R'$ have no more than 20 carbon atoms and $m$ is from 0 to 5. Preferably any alkyl group is methyl, any aryl group is phenyl and $m$ is 0. Specific examples of the capping agents, which are esterifying agents, are acyl halides, i.e., acetyl fluoride, acetyl chloride, acetyl bromide, acetyl iodide, propionyl halides, butyryl halides, stearoyl halides, benzoyl halides, toluoyl halides, naphthoyl halides; methanesulfonyl halides, benzenesulfonyl halides, toluenesulfonyl halides, xylenesulfonyl halides, acetic anhydride, propionic anhydride, octanoic anhydride, benzoic anhydride, toluic anhydride, etc. Specific examples of capping agents which are etherifying agents are dimethyl sulfate, diethyl sulfate, dibutyl sulfate, diisoamyl sulfate, dicyclohexyl sulfate, didodecyl sulfate, di(octyldecyl)sulfate, trimethylhalosilanes, dimethylphenylhalosilanes, methyldiphenylhalosilanes, triphenylhalosilanes, trimethylsiloxydimethylhalosilanes, trimethylsiloxyhexa(dimethylsiloxy)dimethylhalosilanes, etc.

In order that those skilled in the art may better understand my invention, the following examples are given by way of illustration and not by way of limitation. In all the examples, all parts and percentages are by weight unless stated otherwise.

As mentioned previously, the alkali metal ketyls are extremely reactive. This also is true of the polyphenylene ether after it has been reacted with the ketyl. Therefore, in all the examples, an inert moisture-free atmosphere was maintained over the reaction mixture where any metal-organic compound was present and special precautions were taken to dry the solvents before using.

General procedure

Unless stated otherwise, the procedure used was to dissolve the well-dried polyphenylene ether in an anhydrous solvent. The solution of the polymer was placed in the reaction vessel and an inert atmosphere of dry oxygen-free nitrogen established. The same precautions were used in preparing and using the solutions of the metal ketyls.

EXAMPLE 1

The lithium ketyl of benzophenone was prepared under an inert atmosphere by dissolving 0.42 g. of lithium in a solution of 5.46 g. of benzophenone in 50 ml. of tetrahydrofuran to produce an intense purple color.

A solution of poly(2,6-dimethyl-1,4-phenylene ether) was made, without isolation of the solid polymer, from 2,6-xylenol by bubbling oxygen through a vigorously stirred solution of 0.84 g. of cuprous bromide, 4.5 g. of diethylamine, 40 g. of 2,6-xylenol in 400 ml. of toluene containing 20 g. of solid anhydrous magnesium sulfate at room temperature. After 34 minutes, the reaction was stopped by the addition of 1.2 ml. of diethylenetriamine and filtering the reaction mixture through activated alumina. The solution was diluted with additional toluene to give a total volume of approximately 800 ml.

A 100 ml. aliquot of the solution of the polymer was titrated under nitrogen with the above lithium adduct of benzophenone requiring approximately 3 ml. of the solution of the adduct to produce a persistent color of the adduct in the solution of the polyphenylene ether, at which point 2 ml. of acetic anhydride was added. After 15 minutes, the solution was poured into methanol to precipitate the polymer which was separated by filtration and dried.

An infrared spectrum of the polymer which had not been treated with the ketyl showed strong absorption at 3610 cm.$^{-1}$ due to the hydroxyl groups in the polymer. The polymer which had been treated with the ketyl and acetic anhydride was essentially colorless and showed no absorption in its infrared spectrum at 3610 cm.$^{-1}$ showing that the polymer had been decolorized as well as being acetate capped. Similar results are obtained when the other polyphenylene ethers disclosed in my above-mentioned patents and application are used, e.g., poly(2,6-diphenyl-1,4-phenylene ether), poly(2-methyl-6-phenyl-1,4-phenylene ether), poly(1,4-phenylene ether), etc.

EXAMPLE 2

A solution of 10 g. of a poly(2,6-dimethyl-1,4-phenylene ether) in 150 ml. of benzene was divided into six aliquots. Each of these solutions was treated with the above lithium benzophenone ketyl until the color persisted. To each of the solutions, 2 ml. of acetic anhydride was added and the reaction permitted to continue for varying lengths of time, i.e., 2, 4, 8, 16, 32 and 64 minutes with the polymers being precipitated by pouring the solution into methanol. The polymers were redissolved in chloroform, filtered and reprecipitated in methanol and dried in vacuo at 100° C. for three hours. The infrared spectrum of each of these polymers showed no absorption for the hydroxyl group (3610 cm.$^{-1}$) indicating that the reaction with acetic anhydride to produce the acetate capped polymer was extremely rapid since there was no difference for the polymers recovered after the varying times of reaction with the acetic anhydride.

EXAMPLE 3

The sodium ketyl of benzophenone was prepared by dissolving 10 g. of sodium in a solution of 72 g. of benzophenone dissolved in 100 ml. of the dimethyl ether of diethylene glycol producing a blue solution. Two solutions, each containing 5 g. of poly(2,6-dimethyl-1,4-phenylene ether) in 100 ml. of benzene were titrated under nitrogen with the above sodium ketyl until the color persisted. These two solutions were treated with acetic anhydride. The first was precipitated by pouring into methanol after two minutes and the second precipitated in the same way after ten minutes. The infrared spectrum of both polymers showed no absorption for the hydroxyl group showing that the capping reaction again was extremely rapid.

EXAMPLE 4

The sodium ketyl of benzophenone was prepared by shaking 5 g. of sodium, cut in small pieces, with a solution of 12.5 g. of trimethylamine in 150 ml. of benzene and 16.8 g. of benzophenone at room temperature until the sodium dissolved. The solution initially turned blue as the sodium started to dissolve but became deep red as dissolution proceeded.

The above solution was used to titrate a solution of 10 g. of poly(2,6-dimethyl-1,4-phenylene ether) until the color of the ketyl persisted and then acetic anhydride, in an amount in excess of that required to react with the amount of sodium present, was added. The isolated polymer was essentially colorless as was a film pressed from the polymer. Similar results were obtained when N,N,N',N'-tetramethylethylenediamine was used in place of the trimethylamine.

EXAMPLE 5

In this example, a poly(2,6-dimethyl-1,4-phenylene ether) was used having an intrinsic viscosity of 0.65. Its color was determined by dissolving 1 g. of the polymer in 25 ml. of reagent grade chloroform and determining the light transmission through one centimeter of solution, using light of a wavelength of 425 millimicrons. The polymer had 67% transmission.

Lithium benzophenone ketyl was prepared by dissolving 2.7 g. of lithium wire in a solution of 31.9 g. of benzophenone in 700 ml. of tetrahydrofuran. Sodium benzophenone ketyl was prepared by dissolving 5.1 g. of sodium metal in a solution of 18.2 g. of benzophenone in 400 ml. of the dimethyl ether of ethylene glycol (1,2-dimethoxy ethane).

Five solutions of 20 g. of the above polyphenylene ether in 280 ml. of benzene were prepared, after which 20 ml. of benzene were removed from each by distillation to give approximately eight weight percent polymer. To these solutions, the amount of lithium benzophenone ketyl solution added, was such that the actual amount of lithium benzophenone ketyl added was 0.22, 0.44, 2.26, 4.46, and 6.76 g. respectively. The amount added to the first solution was not sufficient to cause the color of the ketyl to persist, but was in the other four solutions. After fifteen minutes, 4 g. of acetic anhydride were added and allowed to react for fifteen minutes. The polymers were precipitated by pouring the solutions into methanol. The light transmission of each was 77, 84, 85, 86 and 90% respectively, demonstrating the great improvement in color obtained by this process. Within experimental error, the intrinsic viscosity of the polymer in each case was unchanged from the original material showing that no cleavage of the polymer had occurred. When the above reactions were repeated, except for the one using the lowest amount of ketyl and omitting the treatment with the acetic anhydride, it was found that although there was some color improvement, the percent transmission was 79% for the polymer treated with 0.22 g. of ketyl and 80% for the other three. Also, the infrared spectra showed that the polymers contained as many hydroxyl groups as the starting material, showing the desirability of not only treating the polymer with the ketyl, but also capping it to obtain the highest degree of color improvement. Similar results were also obtained using the sodium ketyl prepared above in place of the lithium ketyl and dimethyl sulfate in place of the acetic anhydride.

The effect of using an excess amount of the ketyl over that required to produce a permanent color was demonstrated by the fact that the color obtained improved as the amount of excess ketyl increased even though the polymer was completely capped in all but the first solution where sufficient ketyl was not added to cause its color to persist.

Similar results to those given above in the specific examples, are obtained when potassium, rubidium and cesium ketyls of benzophenone as well as ketyls of other diaryl ketones, the other capping agents and the other polyphenylene ethers previously mentioned are used in the above examples.

The fact that the polymers are also stabilized by this treatment is indicated by the fact that when the polymers are subjected to a temperature of 175° C. in air, the hours of exposure before films of the polymers became brittle, are increased over that of the untreated polymer by as much as a factor of two.

The polymers of this invention can be used in any of the wide variety of applications which the polyphenylene ethers of the above reference patents have been used. For example, in the making of fibers, films, molded objects and the like. The fact that they have improved color and better heat stability makes the polymers of this invention more widely applicable, for example in the making of light colored or uncolored objects, for example, films and fibers, where transparency or lack of off shade is highly desirable.

Obviously, other modifications and variations to the present invention are possible in light of the above teachings. It is therefore to be understood that changes may be made in the particular embodiments of the invention described which are within the full intention and scope of the invention as defined by the appended claims.

I claim:
1. The process of capping and improving the color of a polyphenylene ether having the formula

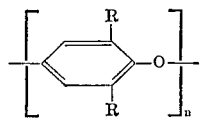

where $n$ is an integer sufficiently large that the number average molecular weight is at least 10,000 and each R is selected from the group consisting of hydrogen, alkyl free of a tertiary α-carbon atom and aryl which comprises (a) reacting a solution of said polyphenylene ether with an amount of an alkali metal adduct of a diaryl ketone sufficient to cause the color of the adduct to persist and (b) thereafter, reacting the solution of the polymer with a capping agent selected from the group consisting of hydrocarbon monocarbonyl halides, hydrocarbon monosulfonyl halides, anhydrides of hydrocarbon monocarboxylic acids, alkyl halides, dialkylsulfates, monohalosilanes and monohalosiloxanes in sufficient quantity to react with all the alkali metal compound of the polyphenylene ether formed in step (a).

2. The process of claim 1 wherein each R is methyl.
3. The process of claim 1 wherein each R is phenyl.
4. The process of claim 1 wherein one R is methyl and the other R is phenyl.
5. The process of claim 1 wherein the capping agent is acetic anhydride.
6. The process of claim 1 wherein the capping agent is dimethyl sulfate.

References Cited

Karrer: Organic Chemistry, Elsevier, Amsterdam 1938, pp. 392–93.

Morantz et al.: J. Faraday Soc. 51, 1375–86 (1955).

Carter et al.: J. Faraday Soc. 56, 343–47 (1960).

WILLIAM H. SHORT, *Primary Examiner.*

M. GOLDSTEIN, *Assistant Examiner.*